United States Patent
Hsu

(12) United States Patent    (10) Patent No.: US 7,862,223 B2
Hsu    (45) Date of Patent: Jan. 4, 2011

(54) THIN AND FLEXIBLE LIGHT GUIDE ELEMENT

(75) Inventor: Lung-Lin Hsu, Kaohsiung (TW)

(73) Assignee: Eternal Chemical Co., Ltd. (TW)

( * ) Notice: Subject to any disclaimer, the term of this patent is extended or adjusted under 35 U.S.C. 154(b) by 205 days.

(21) Appl. No.: 12/080,773

(22) Filed: Apr. 4, 2008

(65) Prior Publication Data

US 2008/0247191 A1    Oct. 9, 2008

(30) Foreign Application Priority Data

Apr. 4, 2007    (TW) ............... 96112233 A

(51) Int. Cl.
*F21V 7/04* (2006.01)

(52) U.S. Cl. .............. 362/618; 362/612; 362/615; 362/619; 362/620; 349/65

(58) Field of Classification Search ............ 362/26–27, 362/612, 615, 618–620; 349/58, 63–65, 349/70

See application file for complete search history.

(56) References Cited

U.S. PATENT DOCUMENTS

| 6,247,826 B1* | 6/2001 | Funamoto et al. ............ 362/603 |
| 2004/0130912 A1* | 7/2004 | Miyashita ................... 362/561 |

* cited by examiner

*Primary Examiner*—Sandra L O Shea
*Assistant Examiner*—Meghan K Dunwiddie
(74) *Attorney, Agent, or Firm*—Ladas & Parry LLP

(57) ABSTRACT

The subject invention provides a thin and flexible light guide element, which comprises a first optical layer composed of a flexible transparent material; a second optical layer formed on the lower side of the first optical layer and having a light-adjusting structure to change the light path; and a third optical layer formed on the upper side of the first optical layer and having a convex-concave structure to homogenize the light emitted from the first optical layer, wherein the first and second optical layers have different refractive indices.

32 Claims, 9 Drawing Sheets

THIN AND FLEXIBLE LIGHT GUIDE ELEMENT

BACKGROUND OF THE INVENTION

1. Field of the Invention

The present invention relates to a thin and flexible light guide element having a cured coating. In particular, the present invention relates to a thin light guide element useful in a backlight module of a liquid crystal display (LCD).

2. Description of the Prior Art

Since a liquid crystal panel does not emit light itself, a backlight module, serving as a brightness source, is an important element of the display function of LCDs, and is very important for enhancing the brightness of LCDs.

In recent years, a new technique using a V-cut light guide plate has been developed in the field of backlight modules, which is popular for the panels used in notebook computers. The V-cut light guide plate is made mainly by directly microfabricating a prism on a light guide plate, and is used in the backlight module in combination with a prism sheet (reverse prism sheet) with downward serration, thereby replacing the two prism sheets with upward serration in conventional backlight modules. As shown in FIG. 1, the V-cut technique mainly employs one reverse prism sheet (3), one V-cut light guide plate (2) and one reflective film (1) under the reverse prism sheet, and a diffusion film (4) above the reverse prism sheet. Compared with the conventional backlight module, the brightness of the backlight module having a V-cut light guide plate can be enhanced by nearly 30%, and thus the required power can be reduced by one third, which is a considerable improvement on energy-saving performance.

However, the V-cut structure tends to make the light guide plate generate bright-and-dark stripes, and there is a need for a technical solution to remove the stripes. Moreover, due to the increasing quality demand of TFT-LCD factories, how to adjust the fine prism surface on one side of the light guide plate and the atomization surface on the other side of the light guide plate so as to optimize the overall performance is one of the focuses of development in recent optical element and precision processing technology.

Furthermore, with the development in soft electronic science and technology, displays have become light, thin, and flexible, and conventional CCFL has been gradually replaced by LED as the light source portion of the backlight module. In addition, conventional V-cut light guide plates normally utilize polymethyl methacrylate as the material, which is rigid and frangible, and are not suitable for flexible displays.

The present invention provides a thin and flexible light guide element suitable for LED light source to overcome the above disadvantages. In the present invention, the light guide element can be prepared by double-side coating the two sides of a flexible substrate with a roll-to-roll continuous process, and thus the thickness of the light guide element is greatly reduced. Since the light-emitting surface of the light guide element of the present invention is coated with a coating layer having a fine convex-concave structure, the hardness of the light guide element can be enhanced and the effect of light diffusion can be achieved after the coating layer is cured, and thus the objective of the present invention is realized.

SUMMARY OF THE INVENTION

The present invention is mainly directed to a thin and flexible light guide element, comprising: a first optical layer composed of a flexible transparent material; a second optical layer formed on the lower side of the first optical layer and having a light-adjusting structure to change the light path; and a third optical layer formed on the upper side of the first optical layer and having a convex-concave structure to homogenize the light emitted from the first optical layer, wherein the first and second optical layers have different refractive indices.

DETAILED DESCRIPTION OF THE INVENTION

Figure 1:
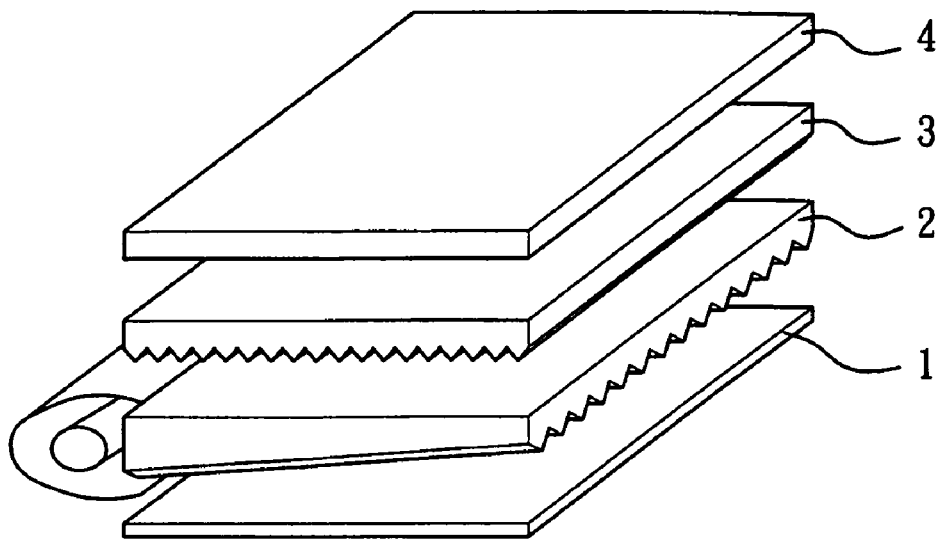
FIG. 1 is a simple schematic diagram of a V-cut backlight module.

The flexible light guide element defined by the present invention refers to a light guide element that can be curled, and when being curled, it does not have observable discontinuous points (for example, kinks, fragments, or segments) on the surface. The flexible light guide element of the present invention can be curled into a cylinder with a diameter as small as 1 cm.

The flexible transparent material suitable for the first optical layer of the thin and flexible light guide element according to the present invention can be any kind of material known to those having ordinary skill in the art, such as plastic. The plastic substrate is not particularly limited and can be any one known to persons having ordinary skill in the art, which includes, for example, but is not limited to, polyester resins, such as polyethylene terephthalate (PET) and polyethylene naphthalate (PEN); polyacrylate resins, such as polymethyl methacrylate (PMMA); polyimide resins; polyolefin resins, such as polyethylene (PE) and polypropylene (PP); polycycloolefin resins; polycarbonate resins; polyurethane resins; triacetate cellulose (TAC); or a mixture thereof. The preferred substrates are those formed from polyethylene terephthalate, polymethyl methacrylate, polycycloolefin resin, or triacetate cellulose, or a mixture thereof. More preferably, the substrate is polyethylene terephthalate. The thickness of the first optical layer is preferably in the range from 16 μm to 300 μm, usually depending on the desired purpose of an optical product.

In order to change the light path to make the light to emit from the front side of the light guide element and to enhance the brightness, the first optical layer of the thin and flexible light guide element of the present invention includes a second optical layer on the lower side thereof, which has a light-adjusting structure to change the light path. The thickness of the second optical layer of the light guide element of the present invention is suitably between 5 μm and 100 μm, preferably between 10 μm and 80 μm, and most preferably between 20 μm and 70 μm. The form of the light-adjusting structure is known to those having ordinary skill in the art, which can be, for example, a regular or irregular columnar structure, a continuously or non-continuously changing columnar structure, a conical structure, a solid angle structure, a lens structure, a wavy structure, or an arc-like block structure. The shape of the columnar structure can be any one known to those of ordinary skill in the art, preferably a prism column (i.e. triangle column) or an arc-like column (i.e. the peak or the valley or both the peak and valley of the columnar structure are circular arc), and more preferably a prism column. The light-adjusting structure of the second optical layer of the present invention is preferably a regular or an irregular prism columnar structure, and more preferably is an irregular prism columnar structure.

In the following, FIGS. 2 to 9 are used to further illustrate the embodiments of the columnar structure of the second optical layer according to the present invention without limiting the scope of the present invention.

Figure 2:
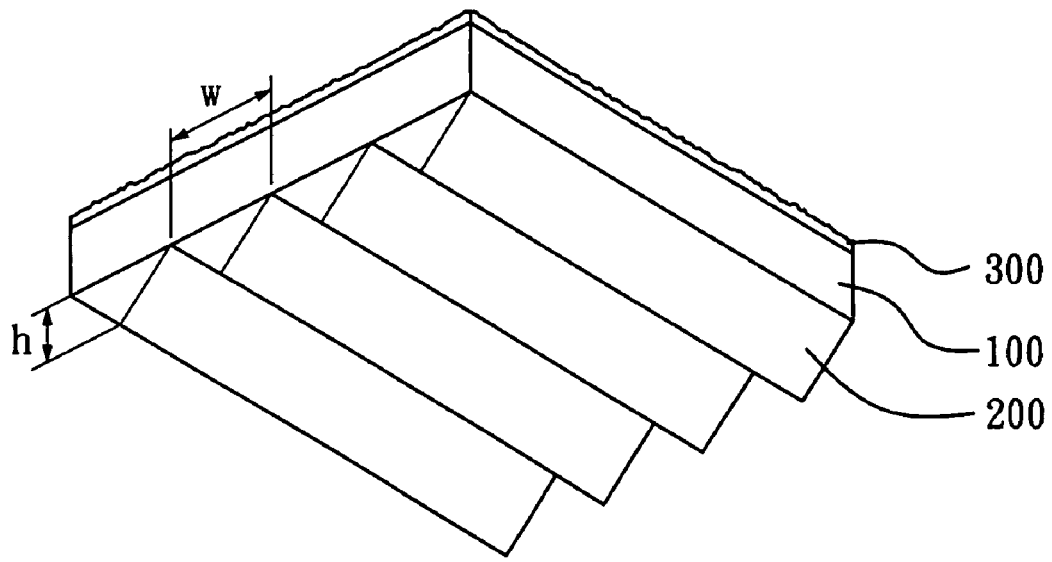
FIGS. 2 to 5 are embodiments of the thin and flexible light guide element according to the present invention.
Figure 3:
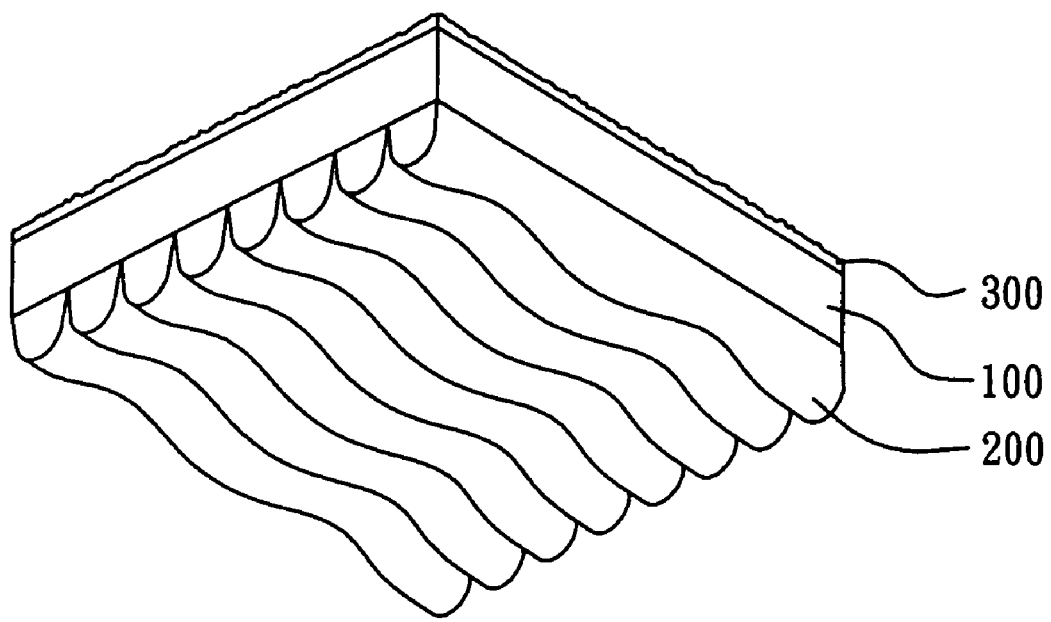
Figure 4:
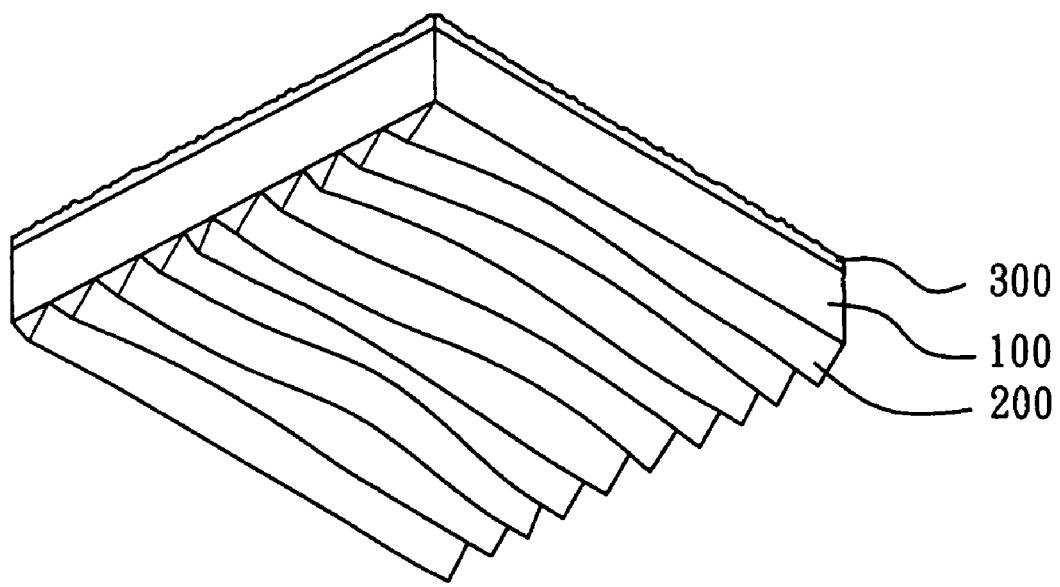
Figure 5:
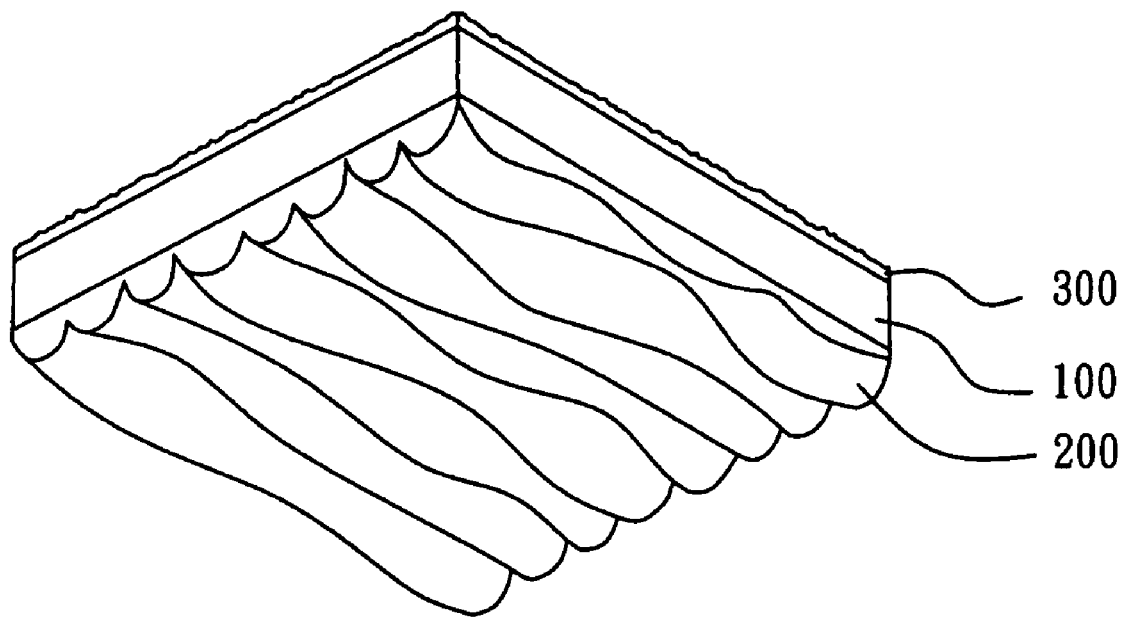

FIGS. 2 to 5 show the thin and flexible light guide element of the present invention, which comprises a first optical layer 100, a second optical layer 200, and a third optical layer 300. The light-adjusting structure on the second optical layer shown in FIG. 2 is a regular prism columnar structure with a vertex angle of 90° where the prism structures are not crossed with one other, and has a fixed prism width (w) and height (h). The light-adjusting structure on the second optical layer shown in FIG. 3 is a regular arc-like columnar structure, and a same columnar structure can have different heights at different positions along the length direction. The light-adjusting structures on the second optical layers shown in FIGS. 4 and 5 are respectively an irregularly arranged prism columnar structure and an irregularly arranged arc-like columnar structure, in which each columnar structure independently has a different width. In addition, a same columnar structure in FIG. 4 can have different heights at different positions along the length direction, and a same columnar structure in FIG. 5 can have different widths at different positions along the length direction.

Figure 6:
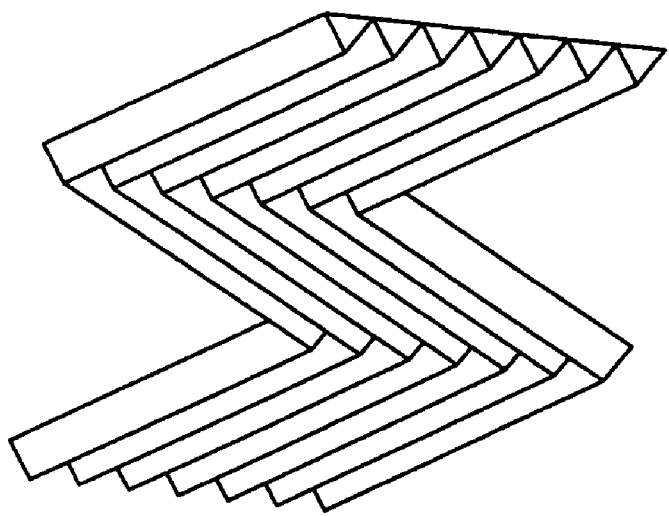
FIGS. 6 to 8 are embodiments of a columnar structure of the second optical layer according to the present invention.
Figure 7:
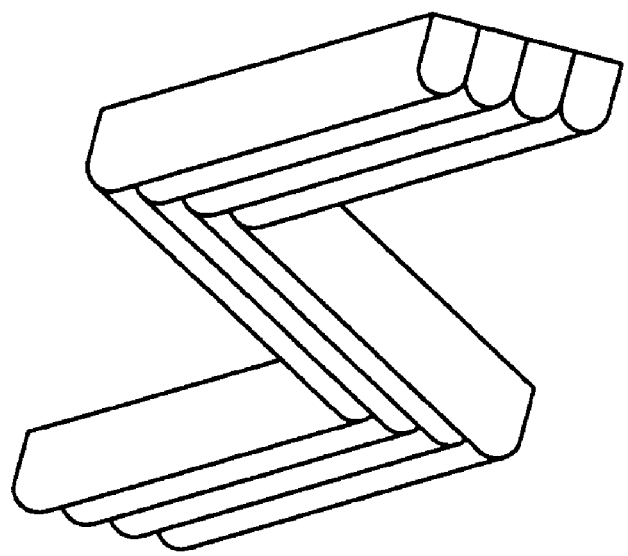
Figure 8:
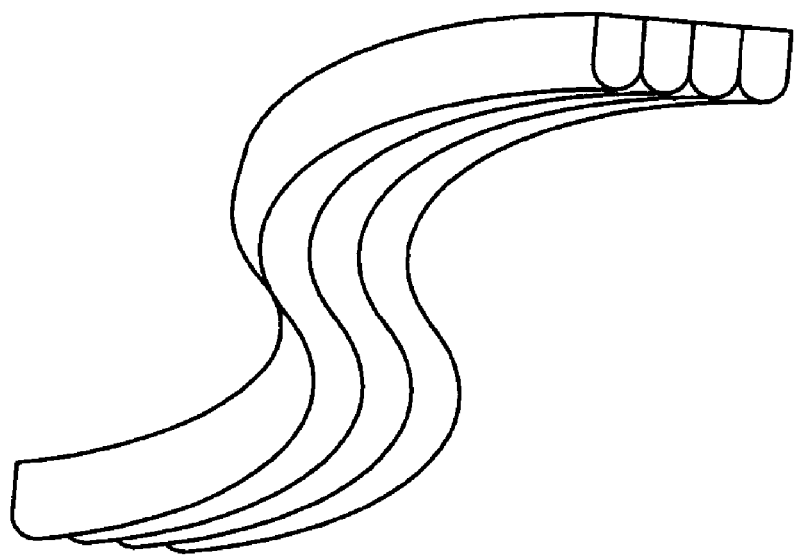

FIGS. 6 to 8 represent other embodiments of the columnar structure of the second optical layer according to the present invention. As shown in FIGS. 6 and 7, the columnar structures are arranged according to a polygonal function. As shown in FIG. 8, the columnar structures are arranged according to a curvilinear function.

Figure 9:
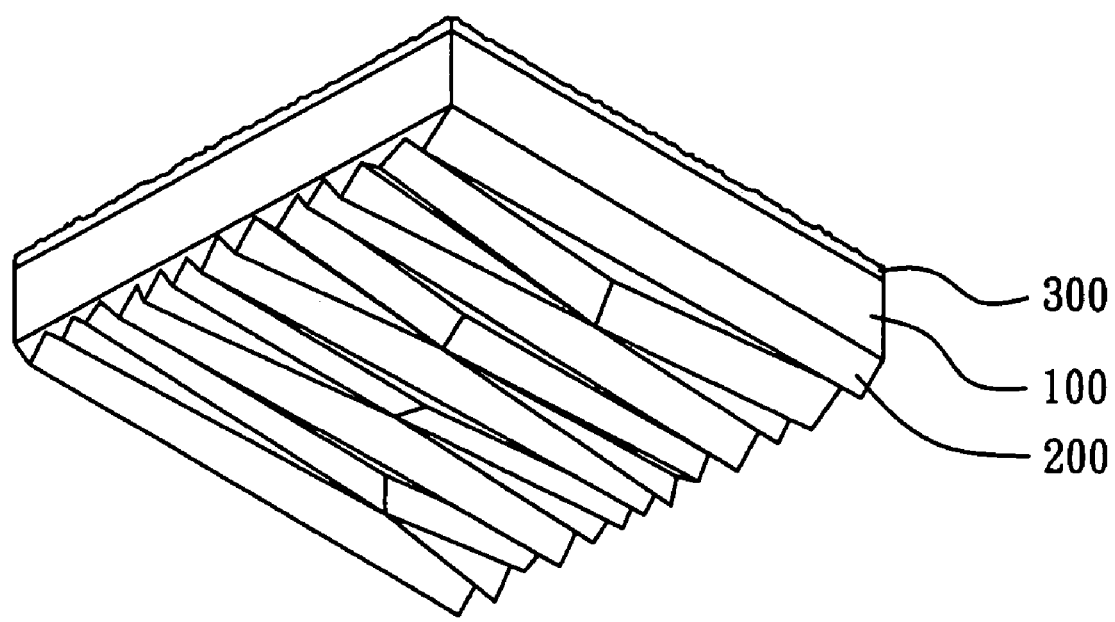
FIG. 9 is a preferred embodiment of the thin and flexible light guide element according to the present invention.
Figure 10:
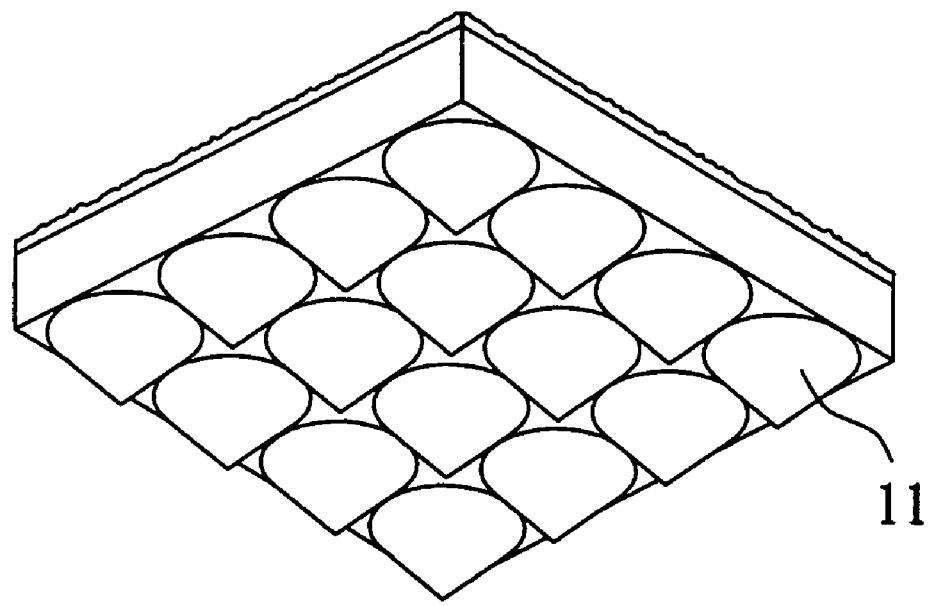
FIGS. 10 to 14 are other embodiments of the thin and flexible light guide element according to the present invention.
Figure 11:
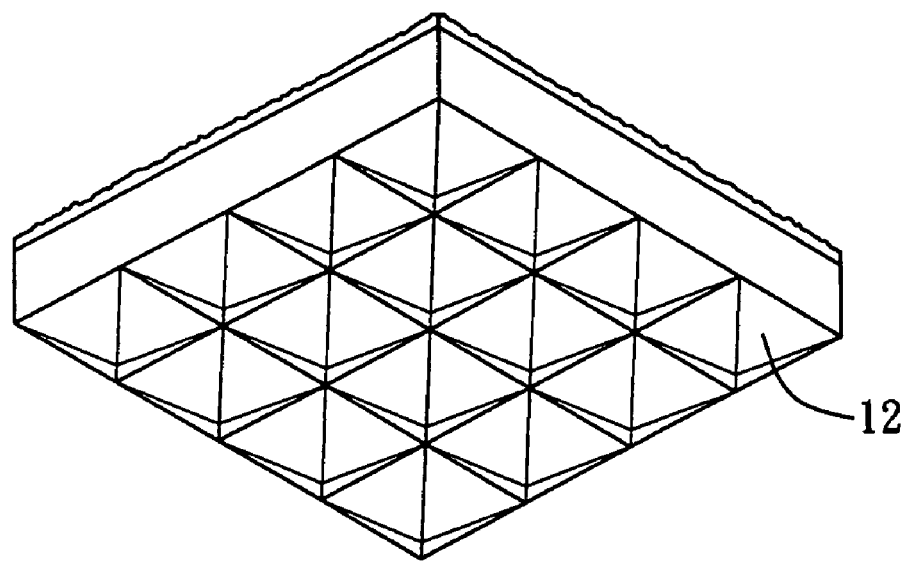
Figure 12:
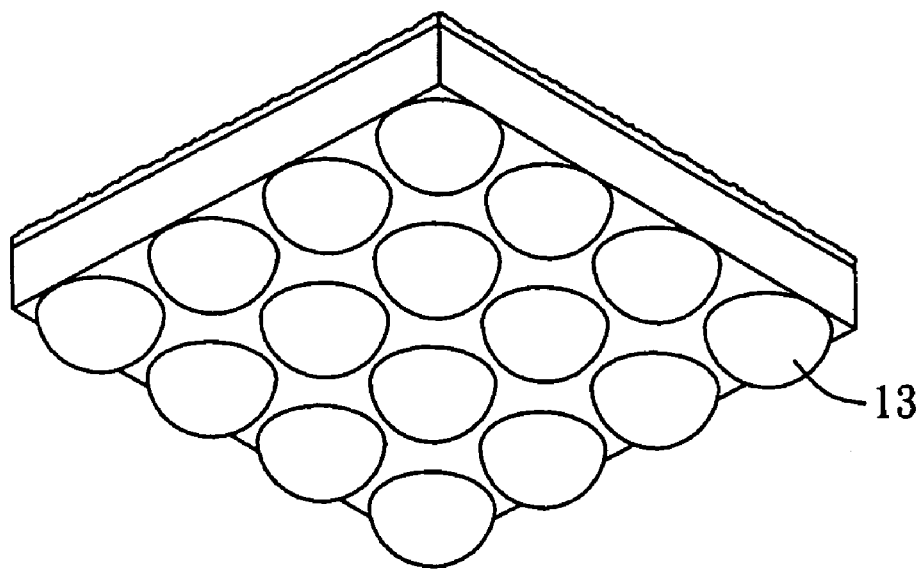
Figure 13:
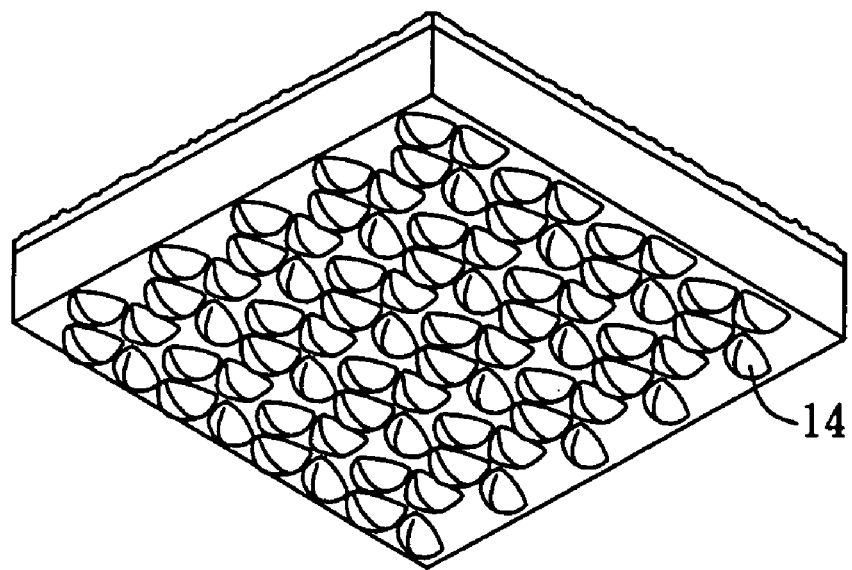
Figure 14:
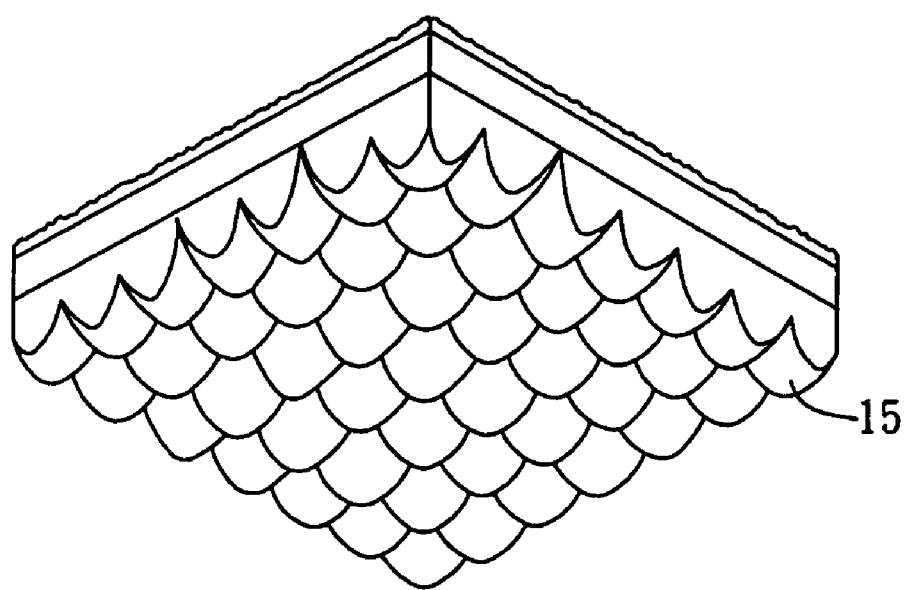

According to a preferred embodiment of the present invention, the light-adjusting structure on the second optical layer of the thin and flexible light guide element of the present invention is substantially composed of a plurality of adjacent and non-parallel columnar structures, but a few parallel columnar structures can still exist. In this preferred embodiment, the shape of the columnar structures is not specifically limited, and can preferably be prism columns or arc-like columns, and more preferably a prism column with a vertex angle from 60° to 120°. In addition, in this preferred embodiment, the columnar structures can be crossed or non-crossed, preferably linearly crossed or non-crossed prism columnar structures. When two prism structures are crossed with one another, the pitch of the adjacent prisms (i.e. the distance between the peaks of the two prisms) is from 0 to 100 μm. When two prism structures are non-crossed with one another, the pitch between the adjacent prisms is from 1 to 100 μm. FIG. 9 is a schematic diagram showing the above-mentioned preferred embodiment. As shown in FIG. 9, the thin and flexible light guide element of the present invention comprises a first optical layer 100, a second optical layer 200, and a third optical layer 300, in which the light-adjusting structure on the second optical layer is substantially composed of a plurality of adjacent and non-parallel columnar structures, and the columnar structures include linearly crossed and non-crossed prism columnar structures.

As described above, in addition to columnar structures, the light-adjusting structures in other forms can be used to constitute the second optical layer of the light guide element of the present invention. FIGS. 10 to 14 exemplify such light guide elements, which respectively have a second optical layer composed of a plurality of conical structures 11, solid angle structures 12, lens structures 13, arc-like block structures 14, and wavy structures 15.

The second optical layer of the present invention is formed by coating a composition comprising at least one ultraviolet (UV) curing resin monomer and a photo initiator onto the first optical layer.

The suitable UV curing resin monomer is well known to those of ordinary skill in the art, which can be, for example, an acrylate monomer having one or more functional groups; a reactive monomer having a high refractive index and containing an aromatic group such as styrene, naphthylethylene, phenyl acrylate, or naphthyl acrylate; or a combination thereof. The acrylate monomers useful for the present invention include, for example, but are not limited to, an acrylate, a methacrylate, a urethane acrylate, and an epoxy acrylate, of which the acrylate and methacrylate are preferred. For example, the acrylate monomer suitable for the present invention can be selected from methyl methacrylate, butyl acrylate, 2-phenoxy ethyl acrylate, ethoxylated 2-phenoxy ethyl acrylate, 2-(2-ethoxyethoxy)ethyl acrylate, cyclic trimethylolpropane formal acrylate, β-carboxyethyl acrylate, lauryl (meth) acrylate, isooctyl acrylate, stearyl (meth)acrylate, isodecyl acrylate, isborny (meth)acrylate, benzyl acrylate, hydroxypivalyl hydroxypivalate diacrylate, ethoxylated 1,6-hexanediol diacrylate, dipropylene glycol diacrylate, tricyclodecane dimethanol diacrylate, ethoxylated dipropylene glycol diacrylate, neopentyl glycol diacrylate, propoxylated neopentyl glycol diacrylate, ethoxylated bisphenol-A di(meth) acrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate, diethylene glycol dimethacrylate, 2-hydroxyethyl metharcrylate phosphate, tris(2-hydroxy ethyl)isocyanurate triacrylate, pentaerythritol triacrylate, ethoxylated trimethylolpropane triacrylate, propoxylated trimethylolpropane triacrylate, trimethylolpropane trimethacrylate, pentaerythritol tetraacrylate, ethoxylated pentaerythritol tetraacrylate, ditrimethylolpropane tetraacrylate, propoxylated pentaerythritol tetraacrylate, pentaerythritol tetraacrylate, dipentaerythritol hexaacrylate, hydroxyethyl acrylate (HEA), 2-hydroxyethyl methacrylate (HEMA), tripropylene glycol di(meth)acrylate, 1,4-butanediol di(meth)acrylate, 1,6-hexanediol di(meth) acrylate, allylated cyclohexyl di(meth)acrylate, isocyanurate di(meth)acrylate, ethoxylated trimethylol propane tri(meth) acrylate, propoxylated glycerol tri(meth)acrylate, trimethylol propane tri(meth)acrylate, and tris(acryloxyethyl) isocyanurate, and a mixture thereof. Preferably, the acrylate monomer includes 2-hydroxyethyl methacrylate, methyl methacrylate, butyl acrylate, and pentaerythritol triacrylate.

The photo initiator suitable for the present invention will generate free radicals after being irradiated, and initiate a polymerization through the delivery of the free radicals. The photo initiator applicable to the present invention is not particularly limited, which is for example, but not limited to, benzophenone, benzoin, 2-hydroxy-2-methyl-1-phenyl-propan-1-one, 2,2-dimethoxy-1,2-diphenylethan-1-one, 1-hydroxy cyclohexyl phenyl ketone, or 2,4,6-trimethylbenzoyl diphenyl phosphine oxide, or a mixture thereof. Preferably, the photo initiator is benzophenone or 1-hydroxy cyclohexyl phenyl ketone.

The UV curing resin of the second optical layer of the present invention may optionally comprise an oligomer with a molecular weight in the range from $10^3$ to $10^4$. Such oligomers are well known to those skilled in the art, such as, acrylate oligomers, which include, for example, but are not limited to, urethane acrylates, such as aliphatic urethane acrylates, aliphatic urethane hexaacrylates, and aromatic urethane hexaacrylates; epoxy acrylates, such as bisphenol-A epoxy diacrylate and novolac epoxy acrylate; polyester acrylates, such as polyester diacrylate; or homo-acrylates.

In addition, the composition for forming the second optical layer of the thin and flexible light guide element of the present invention can optionally include a conventional additive, for example, inorganic particulates, a leveling agent, an anti-foaming agent, or an anti-static agent.

The second optical layer of the thin and flexible light guide element of the present invention can be manufactured according to any manner well known to those of ordinary skill in the art, for example, by utilizing a roll-to-roll continuous process. For example, a flexible transparent material as described hereinbefore can be used as the first optical layer, and the second optical layer is manufactured by a coating process including the following steps:

(I) mixing a UV curing resin monomer, a photo initiator, and optionally a conventional additive to form a composition;

(II) coating the composition onto a surface of the first optical layer to form a coating layer;

(III) forming a corresponding light-adjusting structure on the coating layer by pressing with a mode having any light-adjusting structure groove as disclosed hereinbefore, and meanwhile, the coating layer is irradiated with an energetic ray to initiate photo polymerization, wherein the intensity of the energetic ray can be 100 to 1000 mJ/cm2, preferably 200 to 800 mJ/cm2; and (IV) demolding to obtain the film.

In step (II), the method suitable for coating the composition from step (I) onto the first optical layer is well known to those skilled in the art, which can be for example, slit die coating, micro gravure coating, or roller coating, or a combination thereof.

In order to homogenize the light emitted from the first optical layer, the first optical layer of the thin and flexible light guide element of the present invention includes a third optical layer having a convex-concave structure on the upper side thereof. The third optical layer is formed by coating a hard coat solution containing an anti-static agent, a UV curing resin, organic particles, and at least one resin selected from the group consisting of a thermal setting resin, a thermal plastic resin, or a mixture thereof, onto the first optical layer. The third optical layer of the present invention has a haze of from 20% to 99%, preferably from 30% to 90% as measured according to the JIS K7136 standard method, and a pencil hardness of 3H or above as measured according to the JIS K5400 standard method. The third optical layer has a surface resistivity in the range from $10^8$ to $10^{12}\Omega/\square$ ($\Omega/\square$ represents ohm/square). Therefore, the light guide element would have an effectively enhanced hardness so as to avoid surface scratch and is imparted with a good anti-static property. The thickness of the third optical layer is preferably in the range from 1 μm to 30 μm, more preferably in the range from 3 μm to 20 μm, and most preferably in the range from 5 μm to 15 μm.

The shape of the organic particles is not particularly limited, and can be, for example, sphere, ellipse, rhombus, or an irregular shape. The species of the particles are also not particularly limited, which can be, for example, methacrylate resin or silicone resin or a mixture thereof, among which the methacrylate resin is preferred. The above-mentioned particles may be the same or different in diameter, which is preferably in the range from about 0.1 μm to about 20 μm. According to the present invention, the organic particles preferably are those with the same diameter, and more preferably are those with a same diameter in the range from about 2 μm to about 15 μm. The amount of the organic particles is from 1 to 300 wt %, preferably from 5 to 30 wt %, based on the total weight of the resin components in the hard coat solution.

The UV curing resin used in the hard coat solution of the present invention comprises at least one resin of an acrylate monomer having one or more functional groups. Suitable acrylate monomers are as those described hereinbefore, among which acrylates and methacrylates are preferred. According to the preferred embodiments of the present invention, the acrylate monomers include HEMA, methyl methacrylate, butyl acrylate, and pentaerythritol triacrylate.

In order to enhance the film-forming property of the hard coat solution, the UV curing resin of the present invention can optionally include an oligomer with a molecular weight in the range from $10^3$ to $10^4$. The species of the oligomers suitable for the present invention are as those described hereinbefore.

The thermal setting resin suitable for the hard coat solution of the present invention has an average molecular weight in the range from $10^4$ and $10^5$, preferably in the range from $2\times10^4$ and $8\times10^4$, and more preferably in the range from $3\times10^4$ and $6\times10^4$. The thermal setting resin of the present invention can be selected from the group consisting of a polyester resin, a poly(meth)acrylate resin, and a mixture thereof, among which poly(meth)acrylate resins, such as polymethyl methacrylate and polymethyl acrylate are preferred. The thermal setting resin should contain —OH, —COOH, or —NH2, preferably —OH, such as hydroxyethyl acrylate (HEA), hydroxypropyl acrylate (HPA), 2-hydroxyethyl methacrylate (HEMA), or hydroxypropyl methacrylate (HPMA), or a mixture thereof.

The thermal plastic resin useful for the hard coat solution of the present invention can be selected from polyester resins; poly(meth)acrylate resins, such as PMMA; and a mixture thereof. The average molecular weight of the thermal plastic resin is generally in the range from $10^4$ and $2\times10^6$, preferably in the range from $2\times10^4$ and $3\times10^5$, and more preferably in the range from $4\times10^4$ and $10^5$. The thermal plastic resin can improve the adhesion between the coating layer and the substrate, and prevent the warp of the film caused by a high temperature.

During the processing or fabrication of the resin material, static electricity will be generated by the friction of the resin materials themselves or between the resin materials and other materials, which makes the free dusts in the air to be aggregated on the surface, resulting in the damage of the expensive electronic devices, and even causing a fire hazard due to the ignition of the combustible gas or powder. Therefore, it is necessary to add an anti-static agent to the resin materials.

The hard coat solution of the present invention can be prepared by directly mixing the anti-static agent and the resin followed by mixing processing. The anti-static agents useful in the hard coat solution of the present invention are not particularly limited and are well known to persons of ordinary skill in the art, which include, for example, ethoxy glycerin fatty acid esters, quaternary amine compounds, aliphatic amine derivatives, epoxy resins (such as polyethylene oxide), siloxane, or other alcohol derivatives, such as poly(ethylene glycol) ester, poly(ethylene glycol) ether and the like.

The hard coat solution of the present invention can optionally include an additive known to persons of ordinary skill in the art, which includes, for example, but is not limited to, curing agent, photo initiator, leveling agent, dispersing agent, or stabilizing agent.

The curing agent applicable to the present invention can be any curing agent well known to those of ordinary skill in the art and capable of making the molecules to be chemically bonded with each other to form crosslinking, and can be, for example, but is not limited to, diisocyanate or polyisocyanate.

The photo initiator useful in the present invention will generate free radicals after being irradiated, and initiate a polymerization through delivering the free radicals. Suitable species of the photo initiator are as those described hereinbefore.

The third optical layer of the thin and flexible light guide element of the present invention can be manufactured by any manner well known to those of ordinary skill in the art, for example, by a coating method with a roll-to-roll continuous process. In addition, the coating sequence of the second optical layer and the third optical layer is not particularly limited. For example, the second optical layer can be firstly coated on the first optical layer, and then the third optical layer is formed, or the third optical layer can be firstly coated on the first optical layer, and then the second optical layer is formed. In the following, a material coated with a second optical layer is used as an example for further illustrating the present invention without limiting the scope of the present invention.

(I) mixing a UV curing resin, a thermal setting resin, a thermal plastic resin, organic particles, a solvent, and an anti-static agent, and optionally a conventional additive to form a colloidal hard coat solution;

(II) coating the hard coat solution onto another surface of a first optical layer that has a second optical layer on one surface thereof to form a coating layer;

(III) putting the coated substrate into an oven to evaporate the solvent, and heating the substrate for several minutes at an elevated temperature above the curing point of the thermal setting resin to perform a thermal setting polymerization; and (IV) directly irradiating the coating with an energetic ray to initiate photo polymerization to form the third optical layer of the present invention, wherein the intensity of the energetic ray can be in the range from 100 to 1000 mJ/cm$^2$, preferably from 200 to 800 mJ/cm$^2$.

If necessary, the above steps can be repeated to obtain a plurality of third optical layers.

In the above step (II), the method for coating the hard coat solution onto the substrate is well known to those skilled in the art, which can be for example, slit die coating, micro gravure coating or roller coating, or a combination thereof.

The total thickness of the thin and flexible light guide element manufactured by the present invention is in the range from about 30 μm to about 350 μm.

Figure 15:
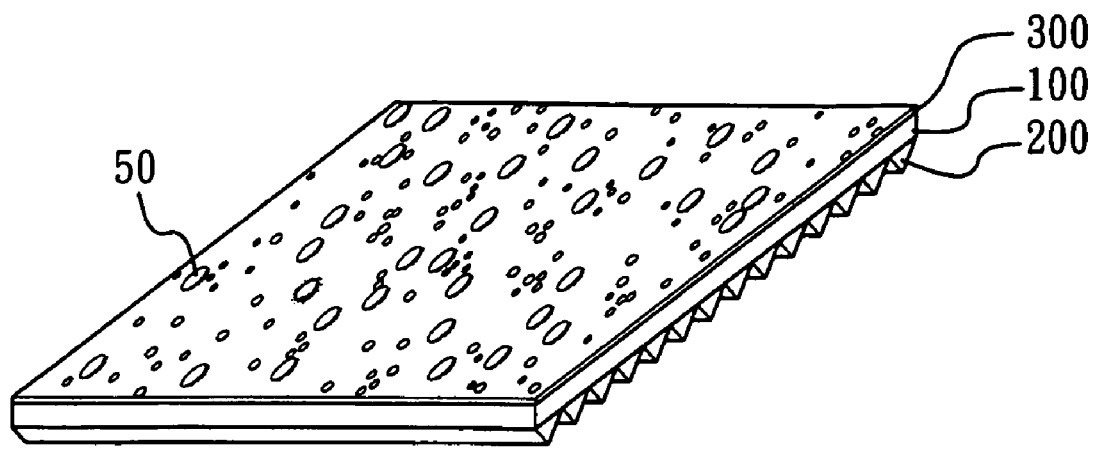
FIG. 15 is an embodiment of the thin and flexible light guide element according to the present invention.

FIG. 15 shows an embodiment of the thin and flexible light guide element of the present invention, in which the first optical layer (100) has a third optical layer (300) having a convex-concave structure on the upper side thereof and a second optical layer (200) having a prism columnar structure on the lower side thereof, and the third optical layer contains organic particles (50). Preferably, the second optical layer in FIG. 15 has the light-adjusting structure as shown in FIG. 9, which provides a better brightness enhancing effect, so as to increase the luminance of the displays.

Conventional V-cut light guide plates are formed by injection molding, so the refractive index of the prism columnar structure is the same as that of the substrate, and the prism should be further designed (for example, in terms of the angle, the width, or the depth) so as to control the reflection direction of the light and achieve the effect of guiding the traveling direction of the light. In addition, if it is intended to obtain a good diffusion effect, it is necessary to perform additional processing on the light emitting surface. As for the thin and flexible light guide element of the present invention, the second optical layer is formed on the first optical layer by a coating method, such that the first and the second optical layers can have different refractive indices, and therefore the traveling path of the light can be controlled to achieve the effect of guiding the direction of the light. According to the present invention, the absolute value of the difference in the refractive indices of the first and the second optical layers is in the range from 0.001 to 0.6. In the present invention, a third optical layer having a convex-concave microstructure is also formed on the first optical layer by a coating method. The microstructure of said third optical layer can diffuse the light directly without additional processing or design. According to an embodiment of the present invention, the first and the third optical layers have different refractive indices, and the absolute value of difference in the refractive indices is in the range from 0.001 to 0.6. However, the scope of the present invention also covers the embodiment in which the first and the third optical layers have similar refractive indices. According to an embodiment of the present invention, a PET film with a refractive index of 1.64 or a film of polycycloolefin resin with a refractive index of 1.50 is used as the first optical layer, and the second and third optical layers are formed from a UV curing resin with a refractive index of about 1.49. According to another embodiment of the present invention, a reactive monomer having an aromatic group is added to increase the refractive index of the second optical layer to 1.58, where the reactive monomer having an aromatic group is as described hereinbefore and can be styrene, naphthylethylene, phenyl acrylate, or naphthyl acrylate. According to still another embodiment of the present invention, inorganic particulates with a particle size of from 10 to 100 nm are added to increase the refractive index of the second optical layer to 2.1, where the inorganic particulates can be titanium dioxide (with a refractive index of 2.72), zinc oxide (with a refractive index of 2.32), zirconium hydroxide, aluminum hydroxide, or silicon dioxide, or a mixture thereof.

Figure 16:
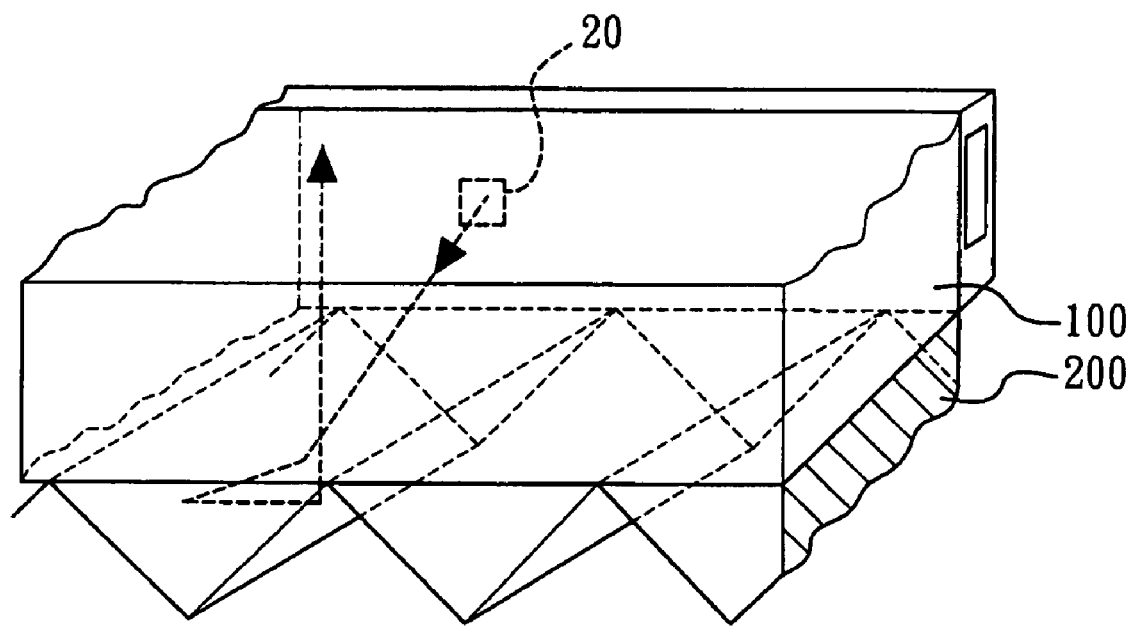
FIG. 16 is a schematic diagram showing the light guide principle of the thin and flexible light guide element according to the present invention.

In the following, FIG. 16 is used as an example to further illustrate the light guide principle of the thin and flexible light guide element of the present invention. As shown in FIG. 16, when the light emitted from an LED light source 20 is projected on the first optical layer 100, the light enters the second optical layer 200 from the first optical layer, such that a first refraction occurs. When the light passes through the prism columnar structure of the second optical layer, two total reflections occur. Then, the light passes through the first optical layer and enters the third optical layer (the third optical layer is not shown in FIG. 16). Finally, the light is diffused by the convex-concave structure of the third optical layer into a uniform surface light source. Therefore, in the thin and flexible light guide element of the present invention, the light traveling path can be controlled by the refractive index difference between the first and the second optical layers and the refraction and total reflection caused by the light-adjusting structure of the second optical layer. As compared with conventional V-cut light guide plates, the present invention can simplify the design of the prism and have relatively low requirements on the precision processing technology, and therefore the yield can be improved.

Furthermore, since the third optical layer of the light guide element of the present invention has a pencil harness of 3H or above as measured according to the JIS K5400 standard method, the contact component can be effectively protected without affecting the optical properties. Since the third optical layer has a fine convex-concave structure and provides a diffusion effect, the problem regarding the light and shade stripes on conventional V-cut light guide plates can be solved.

Figure 17:
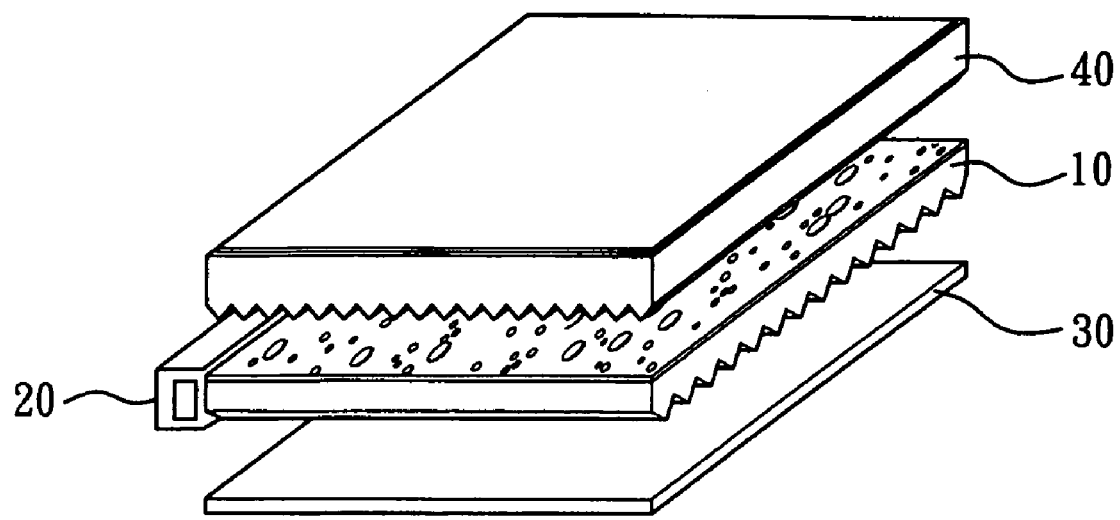
FIG. 17 is a schematic diagram of an LED light module using the thin and flexible light guide element according to the present invention.
Figure 18:
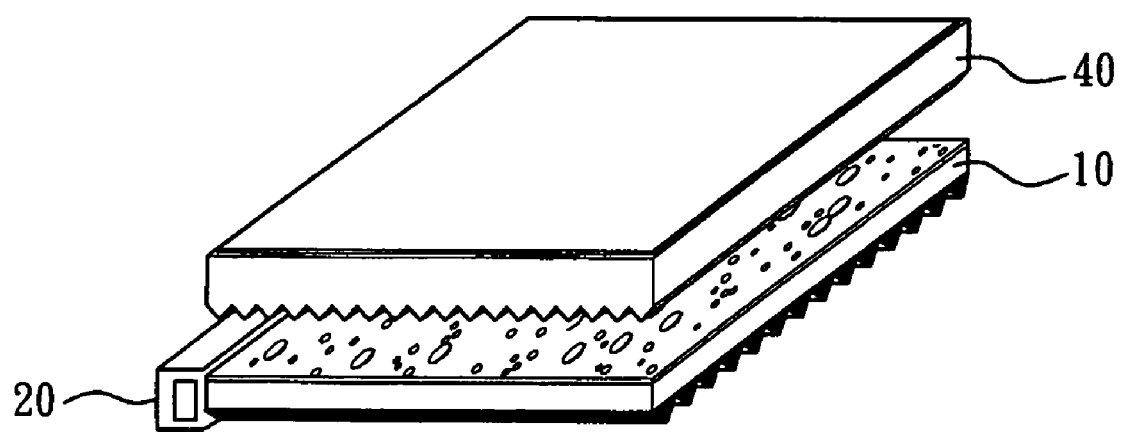
FIG. 18 is a schematic diagram of another LED light module using the thin and flexible light guide element according to the present invention.

The thin and flexible light guide element of the present invention can be used in a flexible light source device, for example, an advertising light box or a display. As shown in FIG. 17, in an embodiment, the thin and flexible light guide element of the present invention can be used in a flexible backlight module with an LED light source. The backlight module includes a reflective film 30, a thin and flexible light guide element 10 according to the present invention, a reverse prism sheet 40, and an LED lamp source 20. In addition, in order to achieve the light reflection effect, in the light guide element of the present invention, a metal material having a high reflectivity, such as silver or aluminum, is further coated by vapor deposition or evaporation on the surface of the light-adjusting structure of the second optical layer. The coating has a thickness of from 0.1 to 5 μm. As shown in FIG. 18, when the surface of the light-adjusting structure of the second optical layer is coated with a material having a high reflectivity, such as silver or aluminum, a light reflection effect is achieved, and less films, such as a reflective film, are necessary.

The following examples are used to further illustrate the present invention, but not intended to limit the scope of the present invention. Any modifications or alterations that can easily be accomplished by persons skilled in the art fall within the scope of the disclosure of the specification and the appended claims.

EXAMPLES

Example 1

To a 250 mL glass bottle, 100 g of a mixture of the monomers of HEMA, methyl methacrylate, butyl acrylate, and pentaerythritol triacrylate and an aromatic urethane hexaacrylate [Etercure 6122-f-80, Eternal Company] and 5 g of a photo initiator: a mixture of benzophenone and 1-hydroxy cyclohexyl phenyl ketone were added. Finally, about 105 g of a coating with a solids content of about 100% was prepared. The coating was coated on a surface of a transparent PET film [U34® (188 μm), Toray Company] by a roller, and pressed with a V-cut roller mold with a vertex angle of 90°, cured with a UV exposure machine (Fusion UV, F600V, 600 W/inch, H-type lamp) with a power set at 100% and at a speed of 10 m/min with an energetic ray of 250 mJ/cm$^2$, and then demolded, to obtain a second optical layer with a thickness of 25 μm. The resultant thin film has a total film thickness of 213 μm, and the second optical layer has a light-adjusting structure as shown in FIG. 9.

To another 250 mL glass bottle, a solvent mixture of 22 g toluene and 22 g butanone was added. Under high speed stirring, 5.28 g methacrylate resin particles with an average particle size of 8 μm [MB30X-8, SEKISUI Chemical Company], 18 g of a UV curing resin: a mixture of the monomers of HEMA, methyl methacrylate, butyl acrylate, and pentaerythritol triacrylate, and an aliphatic urethane hexaacrylate [Etercure 6149-11, Eternal Company], 18 g of a thermal setting resin: an acrylate resin [Eterac 7363-ts-50, Eternal Company] (with a solids content of about 50%) were added sequentially, and then, 2.0 g of a curing agent [Desmodur 3390, Bayer Company] (with a solids content of about 75%), 3.6 g of an anti-static agent [GMB-36M-AS, Marubishi Oil Chem. Co., Ltd] (with a solids content of about 20%), and 1 g of a photo initiator: a mixture of benzophenone and 1-hydroxy cyclohexyl phenyl ketone were added. Finally, about 91.88 g of a coating with a solids content of about 40% was prepared. The coating was coated on another surface of the above obtained film by a roller, dried for 1 minute at 100° C., and cured with a UV exposure machine (Fusion UV, F600V, 600 W/inch, H-type lamp) with a power set at 100% and at a speed of 15 m/min with an energetic ray of 200 mJ/cm$^2$, to obtain a third optical layer with a thickness of about 7 μm. The resultant light guide film has a total film thickness of 220 μm. In addition, the third optical layer has a haze of 50% as measured according to the JIS K7136 standard method, and the resultant film has a total light transmittance of 92%. The measurements for the film thickness, the haze, and the total light transmittance are described in detail in the following test methods.

Comparative Example 1

The test for various properties was performed on a commercially available V-cut light guide plate with a thickness of 2000 μm [Enplas Company].

Test Methods

Film Thickness Test: The film thickness of the sample to be tested was measured with a coating thickness gauge (PIM-100, TESA Corporation) under 1 N pressing contact.

Haze and Total Transmittance Test: According to JIS K7136 standard method, the test samples were measured for a haze (Hz) and total transmittance (Tt) with a NDH 5000W Haze Meter (Nippon Denshoku Industries Co., Ltd.).

Pencil Hardness Test: According to JIS K-5400 method, the test samples were tested with a Pencil Hardness Tester [Elcometer 3086, SCRATCH BOY], using Mitsubishi pencil (2H, 3H). The results of the test are shown in Table 1 below.

Surface Resistivity Test: The surface resistivity of the samples was measured according to ASTM D257 standard method with a Superinsulation Meter [EASTASIA TOADKK Co., SM8220&SME-8310, 500 V]. The testing conditions were: 23±2° C., 55±5% RH. The results of the test are shown in Table 1 below.

Scratch Resistance Test: A Linear Abraser [TABER 5750] was used, and a 3M BEF-III-10T film (20 mm length×20 mm width) was affixed on a 600 g platform (area: 20 mm length× 20 mm width). The test samples were tested for scratch resistance under pressure directly on the prismatic microstructure layer of the film. The scratch resistance test was performed in 10 cycles with a test path of 2 inch and a speed of 10 cycle/min. The results of the test are listed in Table 1 below.

High-temperature Warp Test: The test samples were cut into level films with 100 mm length×100 mm width, placed in an oven at 120° C. for 10 min, and then taken out and left at room temperature. After being cooled down to the room temperature, the films were measured for warping level on the four corners with a gap gauge (recording unit: millimeter (mm), recording manner: for example, 0;0;0;0), and thereby, the test samples were evaluated for heat-resistant and warp-resistant properties. The results of the test are listed in Table 1 below.

High-temperature and High-humidity Test: The test samples were cut into level films with 100 mm length×100 mm width, placed in an oven at 60° C. with a humidity of 90% RH for 500 hours, and then taken out and left at room temperature. After being cooled down to the room temperature, the films were measured for warping level on the four corners with a gap gauge (recording unit: millimeter (mm), recording manner: for example, 0;0;0;0), and thereby, the test samples were evaluated for high temperature resistance and high humidity resistance properties. The results of the test are listed in Table 1 below.

TABLE 1

| | Example 1 | Comparative Example 1 |
|---|---|---|
| Pencil hardness of the third optical layer | 3 H | 2 H |
| Surface resistivity of the third optical layer (Ω/Square) | $1.3 \times 10^{11}$ | $2.6 \times 10^{16}$ |
| Scratch-resistance test of the third optical layer | No scratch | Scratch |
| Warp test (mm) (120° C., 10 min) | 0; 0; 0; 0 | 0; 0; 0; 0 |
| High temperature and high humidity test (mm) (60° C., 90% RH, 500 hrs) | 0; 0; 0; 0 | 2; 2; 2; 2 |

It can be seen from the results of Example 1 and Comparative Example 1 that, the light guide element fabricated by the present invention has a smaller thickness, possesses excellent anti-static and high hardness properties, and the surface thereof is level without warp, thereby avoiding the optical properties to be adversely affected.

I claim:

1. A thin and flexible light guide element, comprising:
a first optical layer composed of a flexible transparent material;
a second optical layer formed on the lower surface of the first optical layer and having a light-adjusting structure capable of changing the path of light, wherein the second optical layer is formed by coating a composition comprising at least one ultraviolet curing resin monomer and a photo initiator onto the first optical layer; and
a third optical layer formed on the upper surface of the first optical layer and having a convex-concave structure capable of homogenizing the light emitted from the first optical layer;
wherein the first and the second optical layers have different refractive indices.

2. The element as claimed in claim 1, wherein the difference between the refractive indices of the first and the second optical layers has an absolute value in the range from 0.001 to 0.6.

3. The element as claimed in claim 1, wherein the element has a thickness in the range from 30 μm to 350 μm.

4. The element as claimed in claim 1, wherein the flexible transparent material is a plastic substrate.

5. The element as claimed in claim 4, wherein the plastic substrate is selected from the group consisting of polyethylene terephthalate, and polycycloolefin resin, triacetate cellulose, and a mixture thereof.

6. The element as claimed in claim 1, wherein the light-adjusting structure has a form selected from the group consisting of a regular or irregular, continuously or non-continuously changing columnar structure, a conical structure, a solid angle structure, a lens structure, a wavy structure, and an arc-like block structure.

7. The element as claimed in claim 6, wherein the light-adjusting structure is a regular or irregular columnar structure.

8. The element as claimed in claim 7, wherein the columnar structure is a prism columnar structure or an arc-like columnar structure.

9. The element as claimed in claim 6, wherein the light-adjusting structure is an irregular prism columnar structure.

10. The element as claimed in claim 9, wherein the light-adjusting structure comprises a plurality of adjacent and non-parallel columnar structures.

11. The element as claimed in claim 10, wherein the columnar structures include linearly crossed prism columnar structures, linearly non-crossed prism columnar structures or both linearly crossed and non-crossed prism columnar structures.

12. The element as claimed in claim 9, wherein the prism has a vertex angle from 60° to 120°.

13. The element as claimed in claim 11, wherein the pitch between two crossed prism columnar structures is in the range from 0 and 100 μm.

14. The element as claimed in claim 11, wherein the pitch between two non-crossed prism columnar structures is in the range from 1 and 100 μm.

15. The element as claimed in claim 1, wherein the light-adjusting structure further comprises a metal material with a high reflectivity on the surface thereof.

16. The element as claimed in claim 15, wherein the metal material is silver or aluminum.

17. The element as claimed in claim 1, wherein the ultraviolet curing resin monomer is an acrylate monomer having one or more functional groups, a reactive monomer having an aromatic group, or a combination thereof.

18. The element as claimed in claim 17, wherein the acrylate monomer is a methacrylate or an acrylate.

19. The element as claimed in claim 17, wherein the acrylate monomer comprises 2-hydroxyethyl methacrylate, methyl methacrylate, butyl acrylate, and pentaerythritol triacrylate.

20. The element as claimed in claim 17, wherein the reactive monomer having an aromatic group is styrene, naphthylethylene, phenyl acrylate, or naphthyl acrylate.

21. The element as claimed in claim 1, wherein the composition further comprises inorganic particulates that have a particle size of 10 to 100 nm and are selected from the group consisting of titanium dioxide, zinc oxide, zirconium hydroxide, aluminum hydroxide, silicon dioxide, and a mixture thereof.

22. The element as claimed in claim 1, wherein the first and the third optical layers have different refractive indices and the absolute value of the refractive index difference is in the range from 0.001 to 0.6.

23. An LED backlight module comprising an element as claimed in claim 1.

24. A display device, comprising a backlight module comprising the thin and flexible light guide element as claimed in claim 1 and an LED light source.

25. A thin and flexible light guide element, comprising:
a first optical layer composed of a flexible transparent material;
a second optical layer formed on the lower surface of the first optical layer and having a light-adjusting structure capable of changing the path of light; and
a third optical layer formed on the upper surface of the first optical layer and having a convex-concave structure capable of homogenizing the light emitted from the first optical layer;

wherein the first and the second optical layers have different refractive indices and wherein the third optical layer has a surface resistivity in the range from $10^8$ to $10^{12} \Omega/\square$; a haze in the range from 20% to 99% as measured according to the JIS K7136 standard method; and a pencil hardness of 3H or above as measured according to the JIS K5400 standard method.

26. A thin and flexible light guide element, comprising:

a first optical layer composed of a flexible transparent material;

a second optical layer formed on the lower surface of the first optical layer and having a light-adjusting structure capable of changing the path of light; and a third optical layer formed on the upper surface of the first optical layer and having a convex-concave structure capable of homogenizing the light emitted from the first optical layer;

wherein the first and the second optical layers have different refractive indices, and wherein the third optical layer is formed by coating a hard coat solution containing an antistatic agent, a UV curing resin, organic particles, and at least one resin selected from the group consisting of a thermal setting resin, a thermal plastic resin, and a mixture thereof onto the first optical layer.

27. The element as claimed in claim 26, wherein the antistatic agent is selected from ethoxy glycerin fatty acid esters, quaternary amine compounds, aliphatic amine derivatives, epoxy resins, siloxane, or alcohol derivatives.

28. The element as claimed in claim 26, wherein the UV curing resin comprises at least one resin of an acrylate monomer having one or more functional groups.

29. The element as claimed in claim 28, wherein the acrylate monomer is an acrylate or a methacrylate.

30. The element as claimed in claim 28, wherein the acrylate monomer comprises 2-hydroxyethyl methacrylate, methyl methacrylate, butyl acrylate, and pentaerythritol triacrylate.

31. The element as claimed in claim 28, wherein the UV curing resin further comprises a resin of an acrylate oligomer.

32. The element as claimed in claim 26, wherein the organic particles are selected from the group consisting of a methacrylate resin, a silicone resin, and a mixture thereof.

* * * * *